US012603943B2

(12) United States Patent
Haider et al.

(10) Patent No.: US 12,603,943 B2
(45) Date of Patent: Apr. 14, 2026

(54) INTELLIGENT AND ADAPTIVE TELECOMMUNICATION NETWORK DELETES

(71) Applicant: CenturyLink Intellectual Property LLC, Denver, CO (US)

(72) Inventors: Syed Haider, South Elgin, IL (US); Christopher Mahan, Kansas City, MO (US); Boris Abramovich, Maple Grove, MN (US)

(73) Assignee: CenturyLink Intellectual Property LLC, Denver, CO (US)

( * ) Notice: Subject to any disclaimer, the term of this patent is extended or adjusted under 35 U.S.C. 154(b) by 75 days.

(21) Appl. No.: 18/921,977

(22) Filed: Oct. 21, 2024

(65) Prior Publication Data

US 2025/0141973 A1 May 1, 2025

Related U.S. Application Data

(60) Provisional application No. 63/594,717, filed on Oct. 31, 2023.

(51) Int. Cl.
*H04L 67/51* (2022.01)
(52) U.S. Cl.
CPC .................................... *H04L 67/51* (2022.05)

(58) Field of Classification Search
CPC ...................................................... H04L 67/51
See application file for complete search history.

(56) References Cited

U.S. PATENT DOCUMENTS

| | | | | |
|---|---|---|---|---|
| 11,995,467 B1 * | 5/2024 | Goacher | ................ | G06F 9/547 |
| 12,147,564 B1 * | 11/2024 | Ma | ........................ | G06F 16/162 |
| 2024/0061954 A1 * | 2/2024 | Doan | .................. | G06F 21/6245 |

* cited by examiner

*Primary Examiner* — Suraj M Joshi

(57) ABSTRACT

This disclosure describes systems, methods, and devices related to deleting a telecommunications network resource. A method may include receiving an application programming interface (API) delete request identifying a service identifier for a service provided by a user of a telecommunications network or an account identifier of the user of the telecommunications network; traversing the telecommunications network to identify resources between a user who sent the API delete request and an endpoint of the telecommunications network; identifying, based on the traversing, a first resource of the telecommunications network and that uses the service identifier or the account identifier; determining that the service was found on the telecommunications network; determining, based on the service being found on the telecommunications network, a set of commands that will delete the service from the telecommunications network; and generating an API request with the set of commands to delete the service from the telecommunications network.

20 Claims, 8 Drawing Sheets

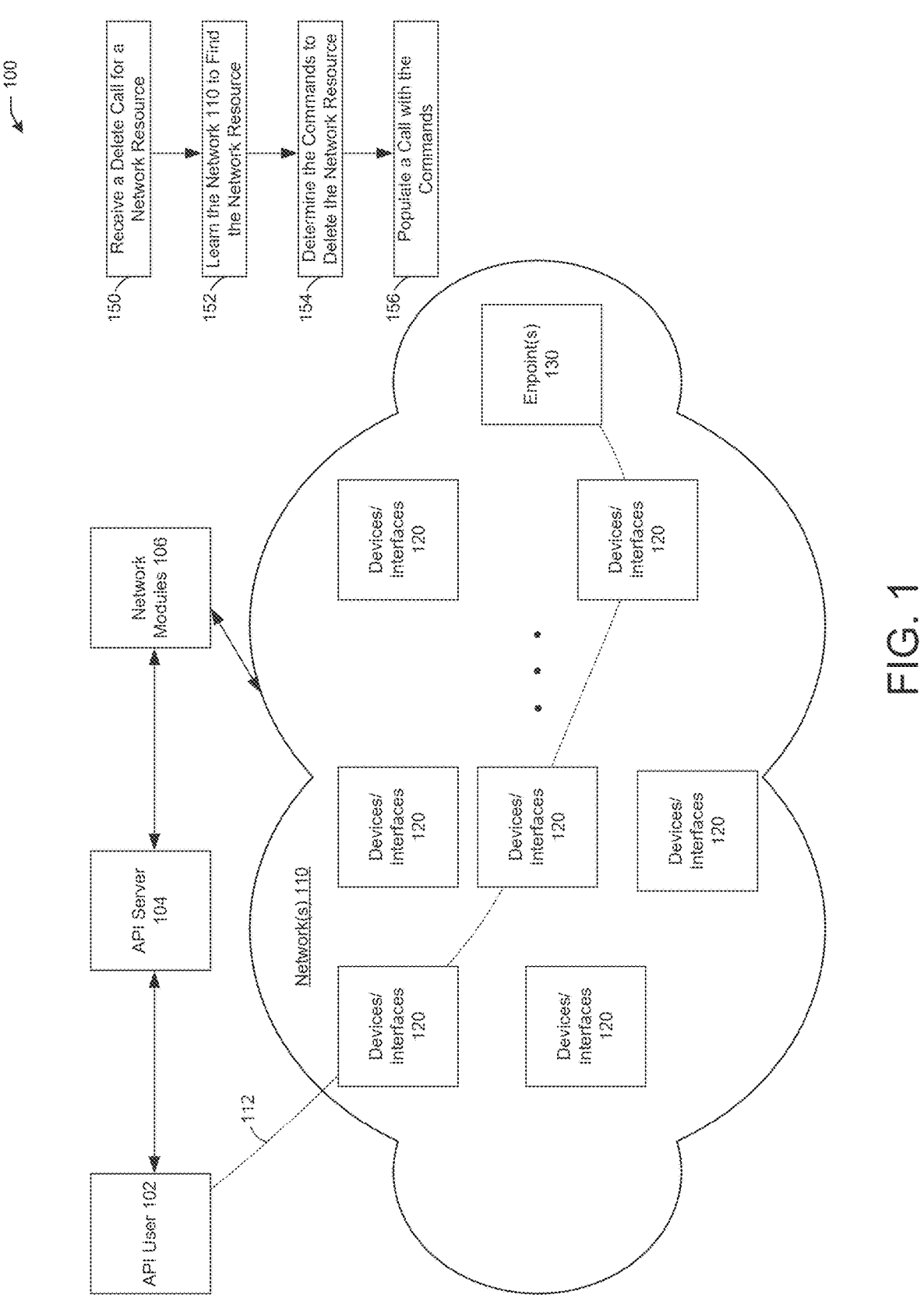

150 — Receive a Delete Call for a Network Resource

152 — Learn the Network 110 to Find the Network Resource

154 — Determine the Commands to Delete the Network Resource

156 — Populate a Call with the Commands

100

Network Modules 106

API Server 104

API User 102

Network(s) 110

Devices/ Interfaces 120

Devices/ Interfaces 120

Devices/ Interfaces 120

Devices/ Interfaces 120

Devices/ Interfaces 120

Devices/ Interfaces 120

Endpoint(s) 130

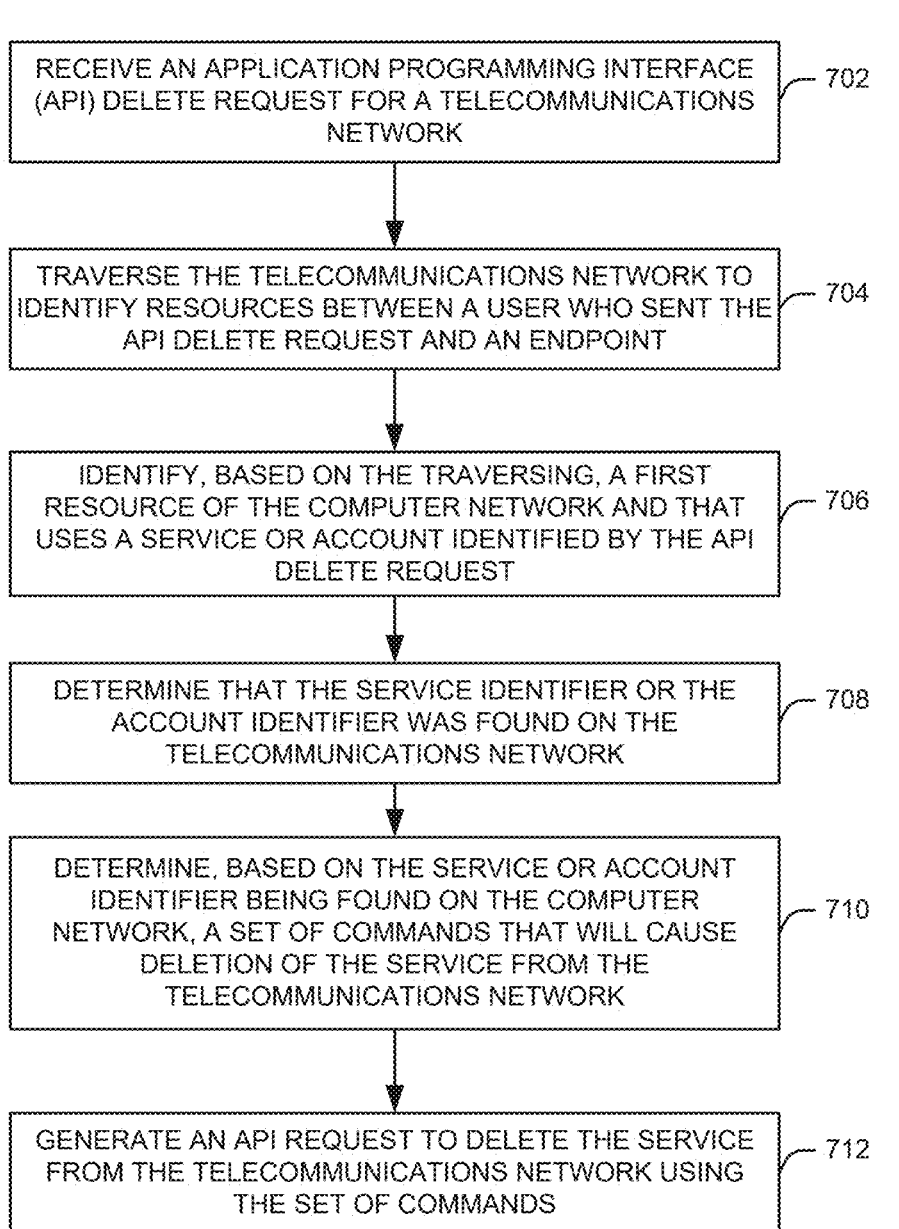

700

RECEIVE AN APPLICATION PROGRAMMING INTERFACE (API) DELETE REQUEST FOR A TELECOMMUNICATIONS NETWORK — 702

TRAVERSE THE TELECOMMUNICATIONS NETWORK TO IDENTIFY RESOURCES BETWEEN A USER WHO SENT THE API DELETE REQUEST AND AN ENDPOINT — 704

IDENTIFY, BASED ON THE TRAVERSING, A FIRST RESOURCE OF THE COMPUTER NETWORK AND THAT USES A SERVICE OR ACCOUNT IDENTIFIED BY THE API DELETE REQUEST — 706

DETERMINE THAT THE SERVICE IDENTIFIER OR THE ACCOUNT IDENTIFIER WAS FOUND ON THE TELECOMMUNICATIONS NETWORK — 708

DETERMINE, BASED ON THE SERVICE OR ACCOUNT IDENTIFIER BEING FOUND ON THE COMPUTER NETWORK, A SET OF COMMANDS THAT WILL CAUSE DELETION OF THE SERVICE FROM THE TELECOMMUNICATIONS NETWORK — 710

GENERATE AN API REQUEST TO DELETE THE SERVICE FROM THE TELECOMMUNICATIONS NETWORK USING THE SET OF COMMANDS — 712

FIG. 7

Processor 1
802

Processor 2
804

•••

Processor 3
806

Deletion Device(s)
809

812

Hypervisor
811

Bus
Controller
822

Memory
Controller
818

System Interface
824

Main Memory
816

INTELLIGENT AND ADAPTIVE TELECOMMUNICATION NETWORK DELETES

CROSS-REFERENCE TO RELATED APPLICATIONS

This application claims the benefit of priority from U.S. Provisional Application No. 63/594,717, filed Oct. 31, 2023, which is incorporated herein in its entirety by reference.

TECHNICAL FIELD

Embodiments of the present disclosure generally relate to systems and methods for intelligently and adaptively responding to network delete requests.

BACKGROUND

In some telecommunications network inventory systems, when a network is activated, an image of the network may be captured and saved based on when the network is set up. When a change is made to the network, the change may not be documented in an inventory system, which may undermine network activations that may rely on updated and accurate inventory for telecommunications networks.

SUMMARY

A method for deleting a telecommunications network resource may include: receiving, by at least one processor, an application programming interface (API) delete request identifying a service identifier for a service provided by a an API user of the telecommunications network; traversing, by the at least one processor, the telecommunications network to identify resources (e.g., routers, switches, and the like) between a user who sent the API delete request and an endpoint of the telecommunications network; identifying, by the at least one processor, based on the traversing, a first resource of the telecommunications network and that uses the service identifier or the account identifier; determining, by the at least one processor, that the service identifier or the account identifier was found on the telecommunications network; determining, by the at least one processor, based on the service identifier or the account identifier being found on the telecommunications network, a set of commands that will cause deletion of the service from the telecommunications network; and generating, by the at least one processor, an API request to delete the service, wherein the API request comprises the set of commands.

A system for deleting a telecommunications network resource, the system including memory coupled to at least one processor of an integration server, the at least one processor able to: receive an application programming interface (API) delete request identifying a service identifier for a service provided by an API user of the telecommunications network; traverse the telecommunications network to identify resources between a user who sent the API delete request and an endpoint of the telecommunications network; identify, based on the traversing, a first resource of the telecommunications network and that uses the service identifier or the account identifier; determine that the service identifier or the account identifier was found on the telecommunications network; determine, based on the service identifier or the account identifier being found on the telecommunications network, a set of commands that will cause deletion of the service from the telecommunications network; and generate an API request to delete the service, wherein the API request comprises the set of commands.

A non-transitory computer-readable storage medium including instructions to cause at least one processor for deleting a telecommunications network resource, upon execution of the instructions by the at least one processor, to: receive an application programming interface (API) delete request identifying a service identifier for a service provided by an API user of the telecommunications network; traverse the telecommunications network to identify resources between a user who sent the API delete request and an endpoint of the telecommunications network; identify, based on the traversing, a first resource of the telecommunications network and that uses the service identifier or the account identifier; determine that the service identifier or the account identifier was found on the telecommunications network; determine, based on the service identifier or the account identifier being found on the telecommunications network, a set of commands that will cause deletion of the service from the telecommunications network; and generate an API request to delete the service, wherein the API request comprises the set of commands.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 1 is an example process for using intelligent and adaptive telecommunications network deletes in accordance with one embodiment.

FIG. 7 is a flow for a process for using intelligent and adaptive telecommunications network deletes in accordance with one embodiment.

DETAILED DESCRIPTION

Figure 2:
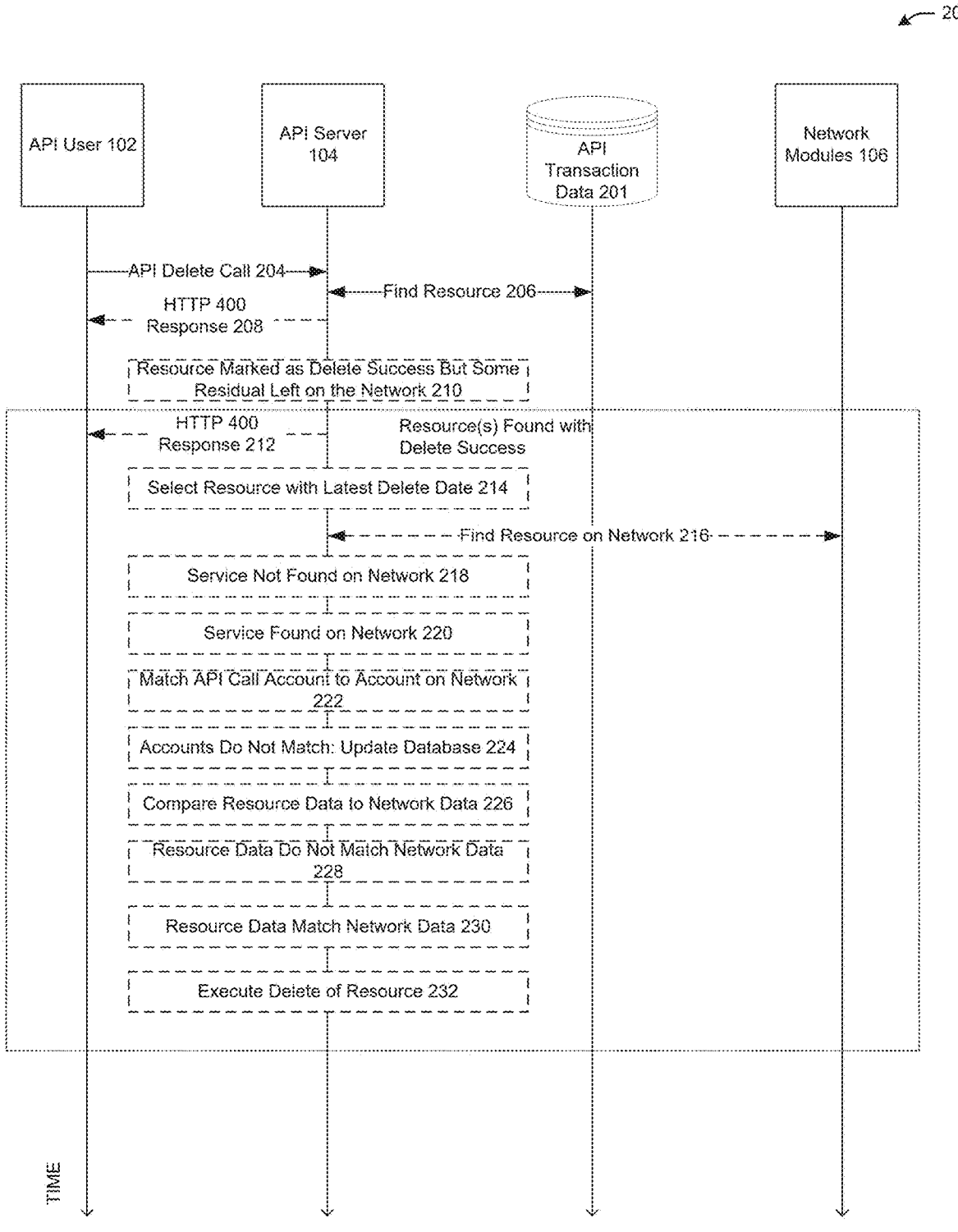
FIG. 2 is an example process for using intelligent and adaptive telecommunications network deletes when a resource is marked as a delete success, but some residual configuration remains on the network in accordance with one embodiment.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. According to some embodiments, as discussed herein, aspects of the present disclosure involve systems, methods, and the like, for intelligently and adaptively responding to network delete requests.

When a customer requests a network activation from a telecommunications network provider (e.g., Ethernet activation, IPVPN (Internet Protocol virtual private network) activation, Internet connection on bare metal backbone of the network, etc.), a partial build and/or partial delete activation may occur. As a result, a network resource may be deleted or released and become available for a subsequent connection. However, in some situations, the actual availability of network resources are not synchronized with the network inventory that documents the use/availability of the network resources. As a result, when a customer requests a network activation, a resource believed to have been deleted may not have been deleted in the network, and when a connection is built using the resource, it may conflict with an existing use of the resource that is mistakenly believed to have been deleted, undermining the build.

Some existing network deletion processes are inefficient. For example, a partial delete on a telecommunications network may not be retry-able via automation (e.g., a provider edge may be deleted in one edge service, but not another due to a device synchronization issue). A service may be updated outside of automation (e.g., something may be added to or removed from a given resource, such as border gateway protocol routes added after an initial build). A service may be groomed to a different device using a process not involving automation (e.g., automation should have pushed a service in inventory and failed). The time spent to create a deletion procedure may vary depending on the network complexity for the deletion. A manual cleanup of a failed deletion may tie up network resources, especially when multiple delete failures occur. When a product is updated to use a network on demand for network activations, data may need to be migrated into the network on demand for older networks that were not built through network on demand services. When network on demand loses its transaction data (e.g., due to a security incident, database failure, or accidental deletes), data recovery can take significant time and network resources.

There is therefore a need for enhanced intelligent and adaptive delete techniques for telecommunication networks.

In one or more embodiments, intelligent and adaptive delete techniques herein for telecommunications networks (e.g., network infrastructure) may learn a network rather than simply relying on the network inventory to determine which network resources are available or being used. Learning the network may include using machine learning with an application programming interface (API). Using a small piece of data (e.g., for a service to be deleted), the enhanced techniques herein may learn the network path and service, learn the resources for the network path and service, and delete the resources for the network path and service. The delete process may be device/vendor-agnostic. For example, some devices have processes for building a path and activating a service that are specific to the type of device/service and not applicable to other devices/services. For example, a particular device/vendor may have specific commands for finding a network path that are limited to that device/vendor, so in a network with other devices/vendors, the commands may not apply, and the ability to find a path using different devices/vendors would be limited only to the devices/vendors that use those commands. The enhanced techniques herein may apply to multiple networks and different types of equipment. In this manner, the enhanced techniques herein learn the devices in a network, regardless of their type/vendor, and learn their commands to be used to delete network resources for delete commands. Once the commands are established, an API may be populated with the commands to perform the desired deletion.

In one or more embodiments, to learn a network, a system may perform a network discovery by identifying a next device in the path. Starting from a device, such as at a customer's location, the system may identify a next device with which to build a network path from the customer's location to an endpoint, and may continue to a subsequent device, and so on until the path from the customer to the endpoint has been identified. A manual process relies on network inventory rather than actually discovering (e.g., traversing) the network, as a person cannot traverse a network without a computer. Traversing a network may include devices calling other nearby devices to determine the next device along a path between endpoints (e.g., customer and a service endpoint). For example, a system may retrieve network resources such as devices, ports, interfaces, and the like to determine which are available and/or used by a service and/or customer. Such retrieval cannot occur manually without a computer, as the network devices may have their own commands to cause actions such as deletions, activations, responses to data requests, and the like. In this manner, traversing a network is different than simply looking at an image or diagram of a service path, or simply analyzing data indicating the path, because a computer must be involved to communicate with and identify subsequent devices along the path.

In one or more embodiments, a user may make an API delete call (e.g., a REST API call) identifying a service, account, and/or device. The API delete call may be made to an API server. In response to the API call, the API server may access a transaction database to identify resources (e.g., network as a service resources) using the service and/or account identifier from the API call. When multiple active resources are identified, an error (e.g., HTTP 400 response) may be returned to the user to indicate that multiple resources were identified. In one case, a resource may be marked as a delete success in the database, but some residual configuration of the resource may be left on the network. This is unlikely to occur, but possible. In this case, an HTTP 400 response may be returned to the user indicating that the resource identified in the API call was already deleted. The API server may select a resource with a latest delete date, and may use a system to identify the resource on the network using the service identifier and device from the API call (e.g., using one or multiple calls to learn the network). If the service is not found on the network, the API server may do nothing. If the service is found on the network, the API server may match the account in the API call with the account in the network. When the accounts do not match, the API server may update the database with a delete failure including a message of invalid data and account mismatch. The API server may compare network resource data (e.g., API resources and/or other telecommunications network resources) with network data, and when the data do not match, the API server may update the database with a delete failure including a message of invalid data and a data mismatch. When the data match, the API server may perform the delete by the resource identifier.

In one or more embodiments, in another case, a network resource may be marked deleted or a build failure, but some residual configuration may be left on the network. This scenario may occur with a partial build or partial delete, for example. When the resource of the user's API delete call is found in the network with a delete failure or build failure, the API server may select the resource with the latest delete date, and return to the user an HTTP 202 response with the resource identifier and a self URL for a GET call. The API server and the system may identify the resource on the network using the service identifier and device (e.g., using one or multiple calls to learn the network). When the service is not found on the network, the API server may update the database with a delete/failure including a message that the resource was not found on the network. When the service is found on the network, the API server may match the account from the API delete call to the account on the network. When the accounts do not match, the API server may update the database with a delete/failure with a message of invalid data and account mismatch. The API server may compare resource data with network data based on guidelines of a valid data match. When the resource data and the network data do not match, the API server may update the database with a delete/failure including a message of invalid data and data mismatch. When the data match, the API server may execute the delete by the resource of the API delete call.

In one or more embodiments, another case may include when the requested resource to be deleted is marked as a build success. This may occur with a regular delete, or when the service is cleaned up manually, either partially or completely from the network. In this case, when only one active resource is identified from the API delete call, the API server may respond with an HTTP 202 response including the resource identifier from the API delete call and a self URL for a GET call. The API server and the system may find the resource on the network using the service identifier and device from the API delete call (e.g., using one or multiple API calls to learn the network). When the service is not found on the network, the API server may update the database with a delete/failure including a message of resource not found on the network. When the service is found on the network, the API server may match the account identifier from the API delete call to the account identifier on the network. When the accounts do not match, the API server may update the database with a delete/failure including a message of invalid data and account identifier mismatch. The API server may compare resource data with network data based on guidelines of a valid data match. When the data do not match, the API server may update the database with a delete/failure including a message of invalid data and data mismatch. When the data match, the API server may execute the delete by the resource identifier.

In one or more embodiments, in some cases the resource in the API delete request may not be found. This may occur when the service was not built using the system or was groomed to a different device. When the resource is not found, the API server may create a resource and resource identifier with a build/success. The API server may prepare API transaction data (e.g., asset, operation, tasks for interactions), and the like. The API server may respond to the API delete call with an HTTP 202 response with the resource identifier from the delete call and a self URL for a GET call. The API server and the system may find the resource on the network using the service identifier and device (e.g., using one or multiple API calls to learn the network). When the service is not found on the network, the API server may update the database with a delete/failure including a message of resource not found on the network. When the service is found on the network, the API server may match the account identifier in the delete call to the account identifier in the network. When the accounts do not match, the API server may update the database with a delete/failure including a message of invalid data and account mismatch. The API server may enrich the resource data by adding the network data, and may execute the delete by the resource identifier.

In one or more embodiments, the system for providing the vendor-agnostic view of the network may include software that, when provided with the service identifier and the device from the API delete call, the system may learn the network, its devices and commands, and return them to the API server. Learning the network may include a network discovery of identifying a next device, which allows for determining whether a device in a network path from the customer to the endpoint actually exists and is being used in the path for the customer and the service.

In one or more embodiments, the system may use machine learning to identify and learn from previous failures in delete attempts, and determine the commands to use for a delete. For example, the machine learning algorithm may learn a number of objects (e.g., VLAN—virtual local area network, VNI—virtual network instance, VPC—virtual private cloud, sub-interfaces, and the like) in a delete, and based on the objects may determine the commands to use for a delete. In addition, an activation application may use the system to identify device conflicts (e.g., when a device is being used by multiple services/accounts), so the machine learning may use the conflict information, the commands that were and were not executed in deletes, error messages, and the like, and learn what happens on the network based on the commands. The machine learning algorithm may learn which commands to use and not use to effect the requested deletion. Based on the commands needed to perform the delete, the API server may populate the API with the commands that, when executed, cause the deletion of the requested resource.

The enhanced delete techniques herein provide technical advantages over how a system performs a delete function in a telecommunications network with different types of devices operating using different vendor-specific commands. By walking the network rather than simply relying on network inventory, the enhanced techniques allow for learning the actual resources used in a network path between a customer and a service endpoint, and learning which commands for the resources in the network path will cause the deletion without causing errors (e.g., resource conflicts, account mismatches, etc.) and therefore should populate an API to cause the deletion. The enhanced techniques may be applied to multiple telecommunications networks and are vendor/device-agnostic because they learn the devices/interfaces and their commands to effect the delete function.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an example process 100 for using intelligent and adaptive telecommunications network deletes in accordance with one embodiment.

Referring to FIG. 1, an API user 102 may access an API server 104 by making API calls (e.g., using the REST API protocol), such as to delete a service. The API server 104 may invoke network modules 106 to identify a resource for the service and account of the API user 102. The service may use a network 110 and a path 112 through the network from the API user 102, through one or more devices/interfaces 120 (e.g., resources of the network 110, such as routers, switches, and the like), and to an endpoint 130 for the service. To delete an identified network resource for the API delete call, the API server 104 may receive the delete call at block 150. At block 152, the API server 104, using the network modules 106, may learn the network 110 to find the network resource and the path for the service. At block 154, the network modules 106 may determine the commands to delete the network resource. At block 156, the API server 104 may populate an API call with the commands to cause the deletion.

In one or more embodiments, to learn a network, the network modules 106 may perform a network discovery by identifying a next device in the path 112. Starting from a device, such as at a customer's location (e.g., the API user 102), the network modules 106 may identify a next device (e.g., the devices/interfaces 120) with which to build the network path 112 from the customer's location to an endpoint (e.g., the endpoint 130), and may continue to a subsequent device (e.g., the devices/interfaces 120), and so on until the path 112 from the customer to the endpoint has been identified. In this manner, the enhanced techniques herein learn the resources in the network 110, regardless of their type/vendor, and learn their commands to be used to delete network resources for delete commands. Once the commands are established, the API server 104 may populate an API with the commands to perform the desired deletion.

FIG. 2 is an example process 200 for using intelligent and adaptive telecommunications network deletes when a resource is marked as a delete success, but some residual configuration remains on the network in accordance with one embodiment.

Referring to FIG. 2, the process 200 may include the API user 102, the API server 104, and the network modules 106 of FIG. 1 in addition to API transaction data 201. The API user 102 may make an API delete call 204 to the API server

104, including a service identifier, account identifier, and/or device identifier. At step 206, the API server 104 may access the API transaction data 201 to find a resource using the service identifier and/or account identifier. Optionally, when multiple active resources are found, the API server 104 may return an HTTP 400 response 208 indicating that multiple resources were found. At step 210, the API server 104 may optionally determine that the identified resource was marked as a delete success, but some residual configuration was left on the network (e.g., the network 110 of FIG. 1). Optionally, the API server 104 may respond to the API delete call 204 with an HTTP 400 response 212 indicating that the resource was already deleted.

Still referring to FIG. 2, optionally, at step 214, the API server 104 may select the resource with the latest delete date, and at step 216, may access the network modules 106 to find the resource on the network using the service identifier and device (e.g., using one or more API calls to learn the network). Optionally, at step 218, the service may not be found on the network, in which case the API server 104 may do nothing. Optionally, at step 220, the service may be found on the network, in which case the API server 104 may match the account identifier on the network with the account identifier in the API delete call 204 at step 222. When the accounts do not match at step 224, the API server 104 may update the database with a delete/failure including a message indicating invalid data and account identifier mismatch. Otherwise, the API server 104 may compare the resource data to the network data optionally at step 226. When the resource data and the network data do not match at step 228, the API server 104 may update the database with a delete/ failure including a message indicating invalid data and data mismatch. When the resource data and the network data match at step 230, the API server 104 may execute the delete by the resource identifier at step 232 (e.g., by populating an API with the commands needed to cause the deletion of the resource identified by the resource identifier).

Figure 3:
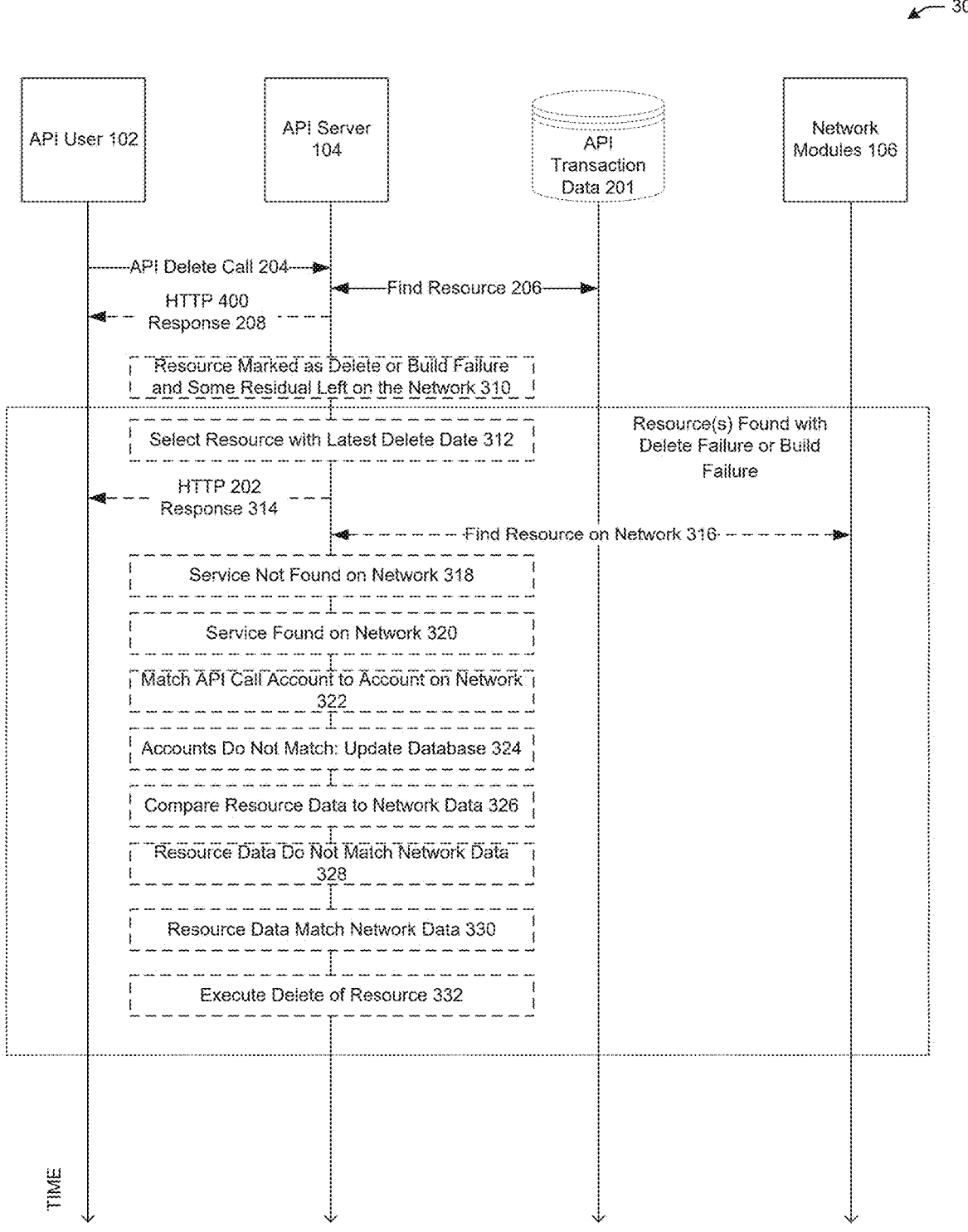
FIG. 3 is an example process for using intelligent and adaptive telecommunications network deletes when a resource is marked as a delete or build failure, but some residual configuration remains on the network in accordance with one embodiment.

FIG. 3 is an example process 300 for using intelligent and adaptive telecommunications network deletes when a resource is marked as a delete or build failure, but some residual configuration remains on the network in accordance with one embodiment.

Referring to FIG. 3, the process 300 may include the API user 102, the API server 104, and the network modules 106 of FIG. 1 in addition to the API transaction data 201 of FIG. 2. The API user 102 may make the API delete call 204 to the API server 104, including a service identifier, account identifier, and/or device identifier. At step 206, the API server 104 may access the API transaction data 201 to find a resource using the service identifier and/or account identifier. Optionally, when resources are found with the delete/ failure or build failure at step 310, the API server 104 at step 312 may select the resource with the latest delete date and may return an HTTP 202 response 314 with the resource identifier and self URL for a GET call.

Still referring to FIG. 3, optionally, at step 316, the API server 104 may access the network modules 106 to find the resource on the network using the service identifier and device (e.g., using one or more API calls to learn the network). Optionally, at step 318, the service may not be found on the network, in which case the API server 104 may update the database with a delete/failure including a message of resource not found on the network. Optionally, at step 320, the service may be found on the network, in which case the API server 104 may match the account identifier on the network with the account identifier in the API delete call 204 at step 322. When the accounts do not match at step 324, the API server 104 may update the database with a delete/ failure including a message indicating invalid data and account identifier mismatch. Otherwise, the API server 104 may compare the resource data to the network data option-ally at step 326. When the resource data and the network data do not match at step 328, the API server 104 may update the database with a delete/failure including a message indi-cating invalid data and data mismatch. When the resource data and the network data match at step 330, the API server 104 may execute the delete by the resource identifier at step 332 (e.g., by populating an API with the commands needed to cause the deletion of the resource identified by the resource identifier).

Figure 4:
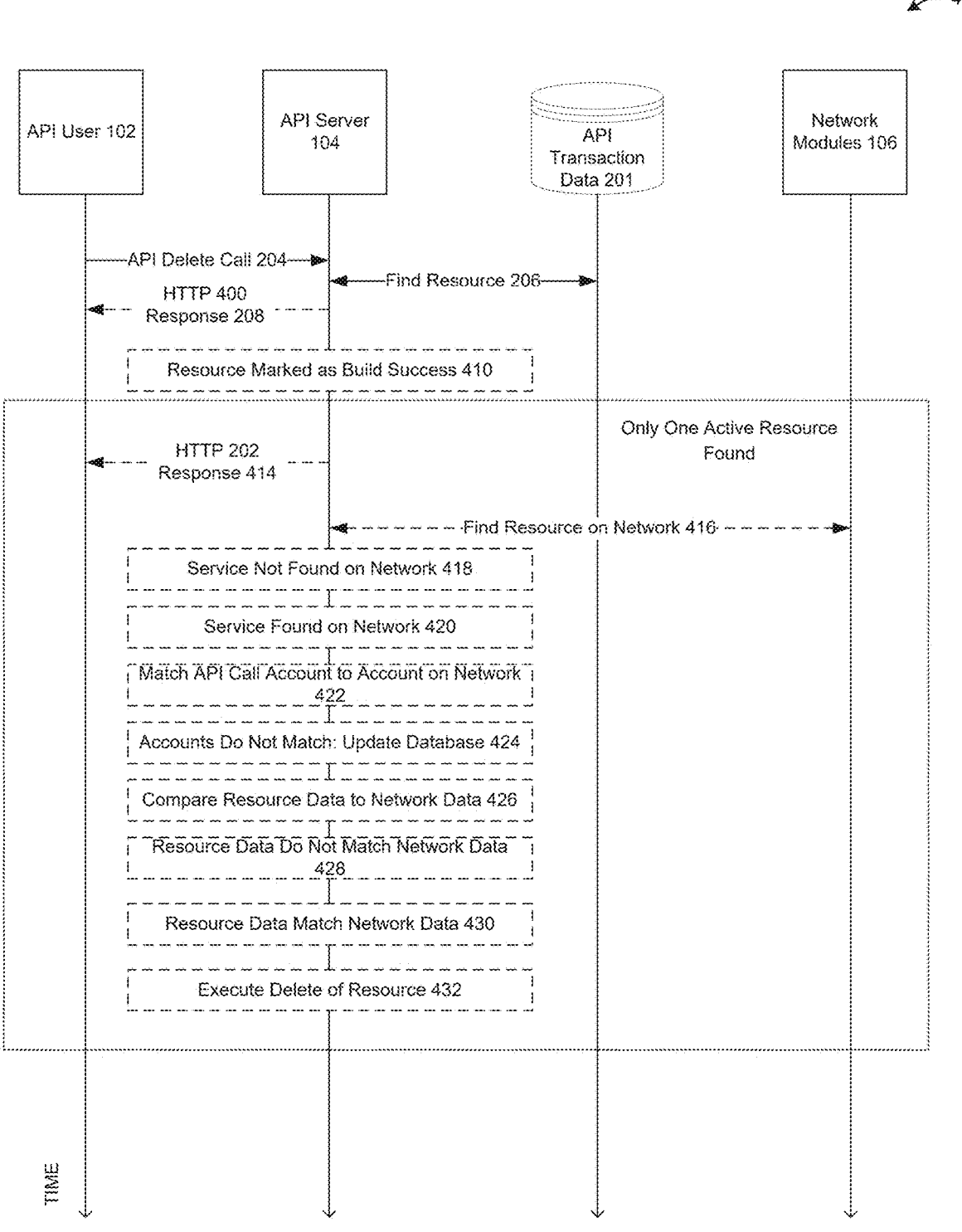
FIG. 4 is an example process for using intelligent and adaptive telecommunications network deletes when a resource is marked as a build success in accordance with one embodiment.

FIG. 4 is an example process 401 for using intelligent and adaptive telecommunications network deletes when a resource is marked as a build success in accordance with one embodiment.

Referring to FIG. 4, the process 401 may include the API user 102, the API server 104, and the network modules 106 of FIG. 1 in addition to the API transaction data 201 of FIG. 2. The API user 102 may make the API delete call 204 to the API server 104, including a service identifier, account iden-tifier, and/or device identifier. At step 206, the API server 104 may access the API transaction data 201 to find a resource using the service identifier and/or account identi-fier. Optionally, when only one active resource is found and marked as a build success at step 410, the API server 104 at step 414 may respond to the API call 204 with an HTTP 202 response including the resource identifier and a self URL for a GET call.

Still referring to FIG. 4, optionally, at step 416, the API server 104 may access the network modules 106 to find the resource on the network using the service identifier and device (e.g., using one or more API calls to learn the network). Optionally, at step 418, the service may not be found on the network, in which case the API server 104 may update the database with a delete/failure including a mes-sage of resource not found on the network. Optionally, at step 420, the service may be found on the network, in which case the API server 104 may match the account identifier on the network with the account identifier in the API delete call 204 at step 422. When the accounts do not match at step 424, the API server 104 may update the database with a delete/ failure including a message indicating invalid data and account identifier mismatch. Otherwise, the API server 104 may compare the resource data to the network data option-ally at step 426. When the resource data and the network data do not match at step 428, the API server 104 may update the database with a delete/failure including a message indi-cating invalid data and data mismatch. When the resource data and the network data match at step 430, the API server 104 may execute the delete by the resource identifier at step 432 (e.g., by populating an API with the commands needed to cause the deletion of the resource identified by the resource identifier).

Figure 5:
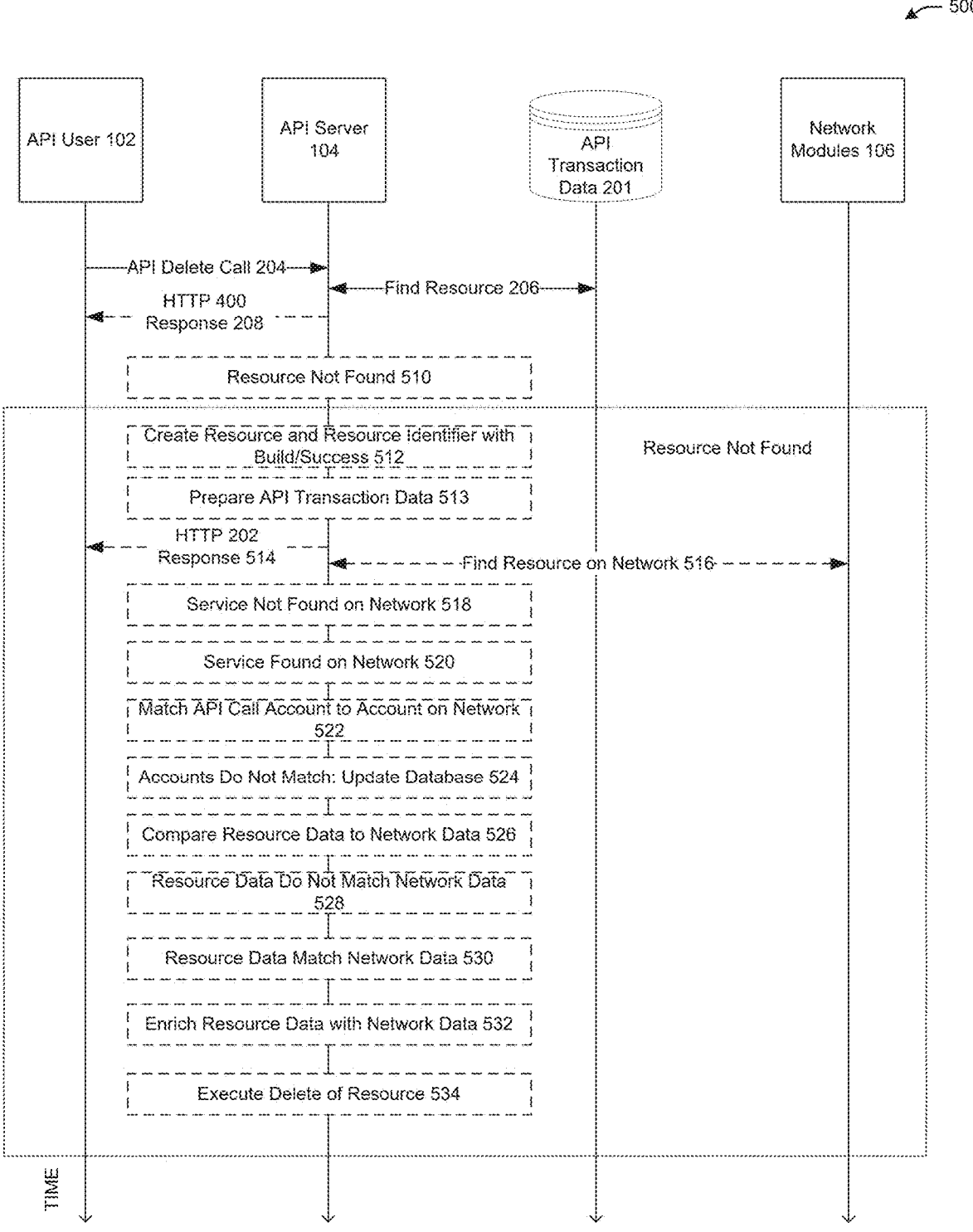
FIG. 5 is an example process for using intelligent and adaptive telecommunications network deletes when a resource is not found in accordance with one embodiment.

FIG. 5 is an example process 500 for using intelligent and adaptive telecommunications network deletes when a resource is not found in accordance with one embodiment.

Referring to FIG. 5, the process 500 may include the API user 102, the API server 104, and the network modules 106 of FIG. 1 in addition to the API transaction data 201 of FIG. 2. The API user 102 may make the API delete call 204 to the API server 104, including a service identifier, account iden-tifier, and/or device identifier. At step 206, the API server 104 may access the API transaction data 201 to find a resource using the service identifier and/or account identi-fier. Optionally, when is not found at step 510, the API server

104 at step 512 may create a resource identifier with a build/success, and at step 513 may prepare API transaction data (e.g., asset, operation tasks for interactions, etc.). Optionally, at step 414, the API server 104 may respond to the API call 204 with an HTTP 202 response including the resource identifier and a self URL for a GET call.

Still referring to FIG. 5, optionally, at step 516, the API server 104 may access the network modules 106 to find the resource on the network using the service identifier and device (e.g., using one or more API calls to learn the network). Optionally, at step 518, the service may not be found on the network, in which case the API server 104 may update the database with a delete/failure including a mes-sage of resource not found on the network. Optionally, at step 520, the service may be found on the network, in which case the API server 104 may match the account identifier on the network with the account identifier in the API delete call 204 at step 522. When the accounts do not match at step 524, the API server 104 may update the database with a delete/ failure including a message indicating invalid data and account identifier mismatch. Otherwise, the API server 104 may compare the resource data to the network data option-ally at step 526. When the resource data and the network data do not match at step 528, the API server 104 may update the database with a delete/failure including a message indi-cating invalid data and data mismatch. At step 530, option-ally, the API server 104 may enrich the resource data with network data, and at step 532 may execute the delete by the resource identifier (e.g., by populating an API with the commands needed to cause the deletion of the resource identified by the resource identifier).

Figure 6:
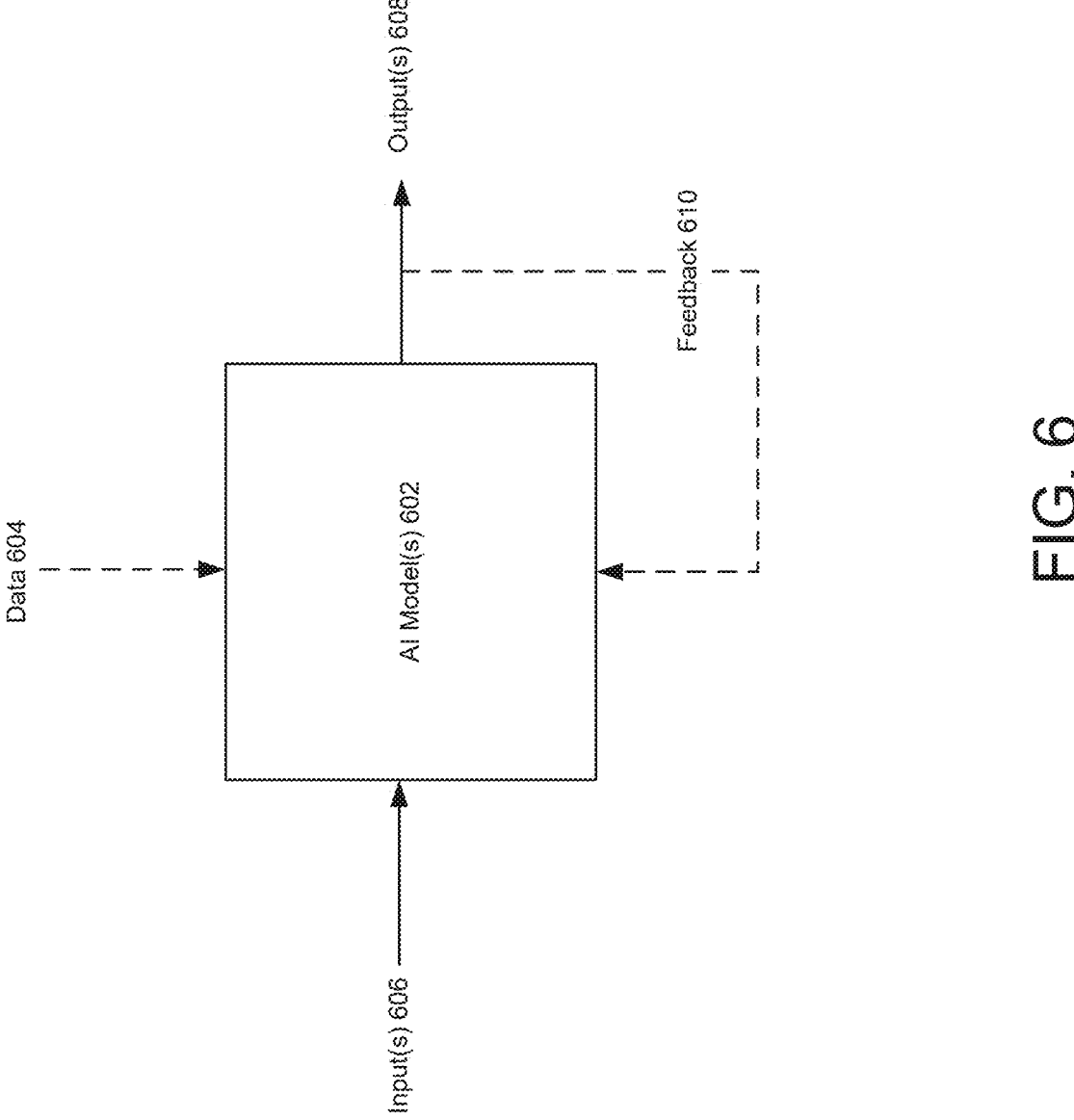
FIG. 6 is an example machine learning model for identifying commands to delete telecommunications network resources in accordance with one embodiment.

FIG. 6 is an example machine learning model 602 for identifying commands to delete telecommunications net-work resources in accordance with one embodiment.

Referring to FIG. 6, the machine learning model 602 may be used by the network modules 106 to learn the commands to use delete a telecommunications network resource. The machine learning model 602 optionally may receive data 604 for training. The data 604 may include previous com-mands used to cause deletions and activations, and the results of those commands, including errors, successful deletions and activations, and the like. The machine learning model 602 may receive inputs 606, such as a resource identifier, service identifier, account identifier, and/or device identifier. The inputs 606 also may include prompts which may include the resource identifier, service identifier, account identifier, and/or device identifier, along with requested outputs (e.g., outputs 608) for the machine learn-ing model 602 to generate (e.g., commands to cause deletion of a resource, rationale, learned commands that previously led to errors, confidence scores, and the like). The data 604 may represent zero-shot, few-shot, or multi-shot learning, depending whether the data include any examples in the inputs 606.

In one or more embodiments, the machine learning model 602 may identify and learn from previous failures in delete attempts, and determine the commands to use for a delete. For example, the machine learning model 602 may learn a number of objects (e.g., VLAN—virtual local area network, VNI—virtual network instance, VPC—virtual private cloud, sub-interfaces, and the like) in a delete, and based on the objects may determine the commands to use for a delete. In addition, the machine learning model 602 may use conflict information, the commands that were and were not executed in deletes, error messages, and the like, and learn what happens on the network based on the commands. The machine learning model 602 may learn which commands to use and not use to effect the requested deletion. Based on the commands needed to perform the delete, the API server 104 of FIG. 1 may populate the API with the commands that, when executed, cause the deletion of the requested resource. The machine learning model 602 may receive feedback 610, such as whether the commands to cause a deletion worked and/or resulted in any errors, and may adjust its criteria based on the feedback 610 such that, for example, a subsequent similar delete request may result in a different set of commands. Similarly, the machine learning model 602 may iteratively generate commands for a deletion and evaluate them until the commands no longer change after multiple iterations or until a confidence score in the commands exceeds a confidence threshold.

FIG. 7 is a flow for a process 700 for using intelligent and adaptive telecommunications network deletes in accordance with one embodiment.

At block 702, a device (or system, e.g., the API server 104 of FIG. 1, the delete devices 809 of FIG. 8) may receive an API delete request for a telecommunications network (e.g., the API delete call 204 of FIG. 2). The API delete request may include a service identifier for a service provided by a telecommunications network, an account identifier of a user account of the telecommunications network, and/or a device (e.g., the user's device).

At block 704, the device may traverse the telecommunications network to identify resources between the requesting user and an endpoint (e.g., identify the path 112 of FIG. 1). Traversing the telecommunications network may include invoking the network modules 106 of FIG. 1, which may access the network 110 and identify next devices between the user's device and the endpoint by retrieving data from the devices and determining which are in use for the account identifier and/or service identifier.

At block 706, the device may identify, based on the network traversing, a first resource of the telecommunications network and that uses a service or account identified by the API delete request of block 702. At block 708, the device may determine that the service identifier or account identifier was found on the telecommunications network.

Based on finding the service identifier or account identifier in use by the telecommunications network, at block 710, the device may determine a set of commands that will cause deletion of the first resource. Determining the set of commands may use machine learning as described further above. Determining the set of commands may include learning the devices based on the network traversal of block 704, the device/interface types/vendors/protocols, and learning the commands used by those device types/vendors/protocols, which may vary based on the types/vendors/protocols.

At block 712, when the set of commands has been determined to cause the deletion, the device may populate (e.g., generate an API request) the API with the set of commands to cause the deletion of the first resource.

It is understood that the above descriptions are for purposes of illustration and are not meant to be limiting.

Figure 8:
FIG. 8 is a diagram illustrating an example of a computing system that may be used in implementing embodiments of the present disclosure.

FIG. 8 is a block diagram illustrating an example of a computing device or computer system 800 which may be used in implementing the embodiments of the components of the network disclosed above. For example, the computing system 800 of FIG. 8 may represent at least a portion of FIG. 1, as discussed above, such as components of the API user 102, the API server 104, the network modules 106, the devices/interfaces 120, and/or the endpoints 130. The computer system (system) includes one or more processors 802-806, one or more deletion devices 809 (e.g., representing at least a portion of the API server 104 and/or the network modules 106), and a hypervisor 811 (e.g., to instantiate and run virtual machines). Processors 802-806 may include one or more internal levels of cache (not shown) and a bus controller 822 or bus interface unit to direct interaction with the processor bus 812. Processor bus 812, also known as the host bus or the front side bus, may be used to couple the processors 802-806 with the system interface 824. System interface 824 may be connected to the processor bus 812 to interface other components of the system 800 with the processor bus 812. For example, system interface 824 may include a memory controller 818 for interfacing a main memory 816 with the processor bus 812. The main memory 816 typically includes one or more memory cards and a control circuit (not shown).

System 800 may include a dynamic storage device, referred to as main memory 816, or a random access memory (RAM) or other computer-readable devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system outlined in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 816, which may be referred to as machine-readable media.

It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations together with all equivalents thereof.

What is claimed is:

1. A method comprising:
receiving an application programming interface (API) delete request identifying a service identifier for a service provided by a user of a telecommunications network or an account identifier of the user of the telecommunications network;
traversing the telecommunications network to identify resources between a user who sent the API delete request and an endpoint of the telecommunications network;
identifying, based on the traversing, a first resource of the telecommunications network and that uses the service identifier or the account identifier;
determining that the service identifier or the account identifier was found on the telecommunications network;
determining, based on the service identifier or the account identifier being found on the telecommunications network, a set of commands that will cause deletion of the service from the telecommunications network; and
generating an API request to delete the service from the telecommunications network, wherein the API request comprises the set of commands.

2. The method of claim 1, further comprising:
comparing, based on the service being found on the telecommunications network, the account identifier of the API delete request to an account identifier of the telecommunications network; and
based on the comparison of the account identifier of the API delete request to the account identifier of the telecommunications network, comparing resource data of the first resource with data of the telecommunications network,
wherein generating the API request to delete the service is based on the resource data matching the data of the telecommunications network.

3. The method of claim 1, further comprising:
determining that the first resource is marked as a delete or build failure and some residual configuration of the first resource remains on the telecommunications network;
selecting the first resource based on the first resource having a latest delete date of the resources; and
sending an API response to the API delete request, the API response comprising a Hypertext Transfer Protocol (HTTP) 202 response comprising an identifier of the first resource and a uniform resource link associated with a GET API request.

4. The method of claim 1, further comprising:
determining that the first resource is marked as a build success; and
sending an API response to the API delete request, the API response comprising a Hypertext Transfer Protocol (HTTP) 202 response comprising an identifier of the first resource and a uniform resource link associated with a GET API request.

5. The method of claim 1, further comprising:
determining that a second resource of the telecommunications network and that uses the service identifier or the account identifier is not found;
generating a resource and a resource identifier with a build/success indicator;
generating API transaction data; and
sending an API response to the API delete request, the API response comprising a Hypertext Transfer Protocol (HTTP) 202 response comprising an identifier of the first resource and a uniform resource link associated with a GET API request.

6. The method of claim 5, wherein the resource is an API resource, the method further comprising:
adding data from the telecommunications network to data of the API resource.

7. The method of claim 1, further comprising:
determining that the first resource is marked as a delete success and that some residual configuration of the first resource remains on the telecommunications network.

8. The method of claim 7, further comprising:
sending an API response to the API delete request, the API response comprising a Hypertext Transfer Protocol (HTTP) 400 response indicating that the first resource was previously deleted.

9. The method of claim 1, wherein determining the set of commands comprises:
prompting a machine learning model to generate the set of commands based on training data indicative of previous delete requests and outcomes of the previous delete requests; and
generating the set of commands using the machine learning model and the training data.

10. A system comprising:
memory coupled to a processor, and
the processor configured to:
receive an application programming interface (API) delete request identifying a service identifier for a service provided by a user of a telecommunications network or an account identifier of the user of the telecommunications network;
traverse the telecommunications network to identify resources between a user who sent the API delete request and an endpoint of the telecommunications network;
identify, based on the traversing, a first resource of the telecommunications network and that uses the service identifier or the account identifier;

17

18 determine that the service identifier or the account identifier was found on the telecommunications network;

determine, based on the service identifier or the account identifier being found on the telecommunications network, a set of commands that will cause deletion of the service from the telecommunications network; and generate an API request to delete the service from the telecommunications network, wherein the API request comprises the set of commands.

11. The system of claim 10, wherein the processor is further configured to:

compare, based on the service being found on the telecommunications network, the account identifier of the API delete request to an account identifier of the telecommunications network; and based on the comparison of the account identifier of the API delete request to the account identifier of the telecommunications network, compare network as a service (NaaS) resource data of the first resource with data of the telecommunications network, wherein to generate the API request to delete the service is based on the NaaS resource data matching the data of the telecommunications network.

12. The system of claim 10, wherein the processor is further configured to:

determine that the first resource is marked as a delete or build failure and some residual configuration of the first resource remains on the telecommunications network;

select the first resource based on the first resource having a latest delete date of the resources; and send an API response to the API delete request, the API response comprising a Hypertext Transfer Protocol (HTTP) 202 response comprising an identifier of the first resource and a uniform resource link associated with a GET API request.

13. The system of claim 10, wherein the processor is further configured to:

determine that the first resource is marked as a build success; and send an API response to the API delete request, the API response comprising a Hypertext Transfer Protocol (HTTP) 202 response comprising an identifier of the first resource and a uniform resource link associated with a GET API request.

14. The system of claim 10, wherein the processor is further configured to:

determine that a second resource of the telecommunications network and that uses the service identifier or the account identifier is not found;

generate a resource and a resource identifier with a build/success indicator;

generate API transaction data; and send an API response to the API delete request, the API response comprising a Hypertext Transfer Protocol (HTTP) 202 response comprising an identifier of the first resource and a uniform resource link associated with a GET API request.

15. The system of claim 14, wherein the processor is further configured to:

add data from the telecommunications network to data of the resource.

16. The system of claim 10, wherein the processor is further configured to:

determine that the first resource is marked as a delete success and that some residual configuration of the first resource remains on the telecommunications network.

17. The system of claim 16, wherein the processor is further configured to:

send an API response to the API delete request, the API response comprising a Hypertext Transfer Protocol (HTTP) 400 response indicating that the first resource was previously deleted.

18. The system of claim 10, wherein the processor is further configured to:

prompt a machine learning model to generate the set of commands based on training data indicative of previous delete requests and outcomes of the previous delete requests; and generate the set of commands using the machine learning model and the training data.

19. A non-transitory computer-readable storage medium tangibly encoded with computer-executable instructions, that when executed by a processor, cause the processor to:

receive an application programming interface (API) delete request identifying a service identifier for a service provided by a user of a telecommunications network or an account identifier of the user of the telecommunications network;

traverse the telecommunications network to identify resources between a user who sent the API delete request and an endpoint of the telecommunications network;

identify, based on the traversing, a first resource of the telecommunications network and that uses the service identifier or the account identifier;

determine that the service identifier or the account identifier was found on the telecommunications network;

determine, based on the service identifier or the account identifier being found on the telecommunications network, a set of commands that will cause deletion of the service from the telecommunications network; and generate an API request to delete the service from the telecommunications network, wherein the API request comprises the set of commands.

20. The non-transitory computer-readable storage medium of claim 19, wherein execution of the instructions further causes the processor to:

compare, based on the service being found on the telecommunications network, the account identifier of the API delete request to an account identifier of the telecommunications network; and based on the comparison of the account identifier of the API delete request to the account identifier of the telecommunications network, compare resource data of the first resource with data of the telecommunications network, wherein to generate the API request to delete the service is based on the resource data matching the data of the telecommunications network.

* * * * *